United States Patent [19]

Sausner et al.

[11] Patent Number: 5,201,840
[45] Date of Patent: Apr. 13, 1993

[54] TEMPERATURE TRANSDUCER

[75] Inventors: Andreas Sausner, Frankfurt; Klaus Mertens, Hemsbach, both of Fed. Rep. of Germany

[73] Assignee: Firma Carl Freudenberg, Weinheim, Fed. Rep. of Germany

[21] Appl. No.: 854,043

[22] Filed: Mar. 18, 1992

[30] Foreign Application Priority Data

Apr. 24, 1991 [DE] Fed. Rep. of Germany ....... 4113294

[51] Int. Cl.$^5$ .......................... G01K 1/14; F01P 11/14
[52] U.S. Cl. .................................... 374/145; 374/163; 374/208; 123/41.15
[58] Field of Search ............... 374/135, 137, 144, 145, 374/146, 147, 148, 163, 208; 73/292; 123/41.15

[56] References Cited

U.S. PATENT DOCUMENTS

| | | | |
|---|---|---|---|
| 1,422,672 | 7/1922 | Coghlan | 374/144 |
| 2,089,613 | 8/1937 | Mayo | 374/145 |
| 3,262,314 | 7/1966 | Gregg | 374/145 |
| 4,587,931 | 5/1986 | Duprez | 123/41.15 |
| 4,651,683 | 3/1987 | Nishida | 123/41.15 |
| 4,702,619 | 10/1987 | Camp et al. | 374/144 |
| 4,764,023 | 8/1988 | White et al. | 374/135 |
| 4,929,093 | 5/1990 | Suzuki et al. | 374/208 |
| 5,080,496 | 1/1992 | Keim et al. | 374/144 |

FOREIGN PATENT DOCUMENTS

| | | | |
|---|---|---|---|
| 2804558 | 8/1979 | Fed. Rep. of Germany | 374/145 |
| 616553 | 6/1978 | U.S.S.R. | 374/144 |
| 2083231 | 3/1982 | United Kingdom | 374/144 |

Primary Examiner—William A. Cuchlinski, Jr.
Assistant Examiner—G. Bradley Bennett
Attorney, Agent, or Firm—Sprung Horn Kramer & Woods

[57] ABSTRACT

A temperature transducer for the cylinder head of a liquid-cooled internal combustion engine. It comprises a housing with a lead that forwards signals from a sensor sensing the temperature of the coolant. The housing accommodates not only a coolant-temperature sensor but at least one component-temperature sensor that rests against a component in the cylinder head and has a separate lead.

12 Claims, 2 Drawing Sheets

TEMPERATURE TRANSDUCER

BACKGROUND OF THE INVENTION

The invention concerns a temperature transducer for the cylinder head of a liquid-cooled internal combustion engine. The transducer comprises a housing with a lead that forwards signals from a sensor sensing the temperature of the coolant.

A temperature transducer of this type is generally known. It is immersed in coolant in the cooling system of an internal-combustion engine. It is usually employed in conjunction with an electronic engine control system that adjusts the fuel-to-air ratio or displays the temperature of the coolant. Such a transducer can only approximately detect the temperature required for the correct mixture of fuel and air. Auxiliary parameters are necessary to approximate a program that will take all the operating variables of the engine into account. Adapting the auxiliary parameters to the specific needs of each engine is time consuming. When a transducer detects just the temperature of the coolant, the result is only precise enough to control the fuel-to-air ratio at stable engine states; that is, at constant motor speeds and loads.

SUMMARY OF THE INVENTION

The principal object of the present invention is to provide an improved temperature transducer of the aforesaid type that will allow both precise adjustment by the engine's controls of the fuel-to-air ratio and simple and rapid determination of the engine's intantaneous operating states.

This object, as well as other objects that will become apparent from the following discussion, are attained, in accordance with the present invention, by the improvement wherein the housing of the temperature transducer accommodates not only a coolant-temperature sensor but at least one component-temperature sensor that rests against a component in the cylinder head and has a separate lead. The advantage is that the two temperature sensors constitute a simple plug-in unit, simplifying assembly. Both coolant and component temperatures can be determined at critical points in the cylinder head and forwarded to the engine control system for establishment and optimization of the requisite mixture of fuel and air. Precise determination of the engine's thermal conditions will save fuel and decrease the level of contaminants in the exhaust. Another advantage is the potential for direct comparison of the temperatures of the engine component and of the adjacent coolant. Routing the lines from the housing leads to the engine control system is also particularly facilitated and made more comprehensible by such an integrated coolant-and-component temperature transducer.

The leads in one advantageous embodiment of the invention forward signals to the electronic control system. Such control system can, for example, be the same system that controls the internal combustion engine itself. The information that the temperature transducer transmits to the electronic control system in relation to coolant temperature and/or component temperature can be exploited as input parameters for a large number of control procedures. It can for example be utilized to activate a thermostatic valve that regulates the flow of coolant through the cylinder head and the downstream internal combustion engine block.

It is practical for the transducer housing to be accommodated in a recess in the cylinder head. In this event the housing can contact and seal off both the front and rear portions of the housing. The component-temperature sensor can be positioned at the front of the housing and the coolant-temperature sensor somewhere between the front and the rear. This design will ensure precise and individual measurements of the temperatures of both the component and the coolant.

The housing is preferably essentially tubular, and the component-temperature sensor, situated where it is at the forward or front part of the housing, will not come into contact with the coolant in the cylinder head. Another advantage is that the component-temperature sensor will be protected from deposits and moisture, ensuring outstanding operating properties and long life. The coolant-temperature sensor on the other hand will be completely immersed in the flowing coolant and along the axis of flow while the engine is running.

The housing can be sealed off from the cylinder head by at least one O-ring. O-rings constitute reliable seals for hollow interiors that liquids have to be kept out of. They are available in a wide range of sizes and strengths and are particularly economical.

The component-temperature sensor in one advantageous embodiment rests against an area of cylinder head wall that demarcates the engine's combustion chamber. The direct contact between the wall section, the surface of which is averted from the combustion chamber and not in contact with the liquid coolant, allows especially precise determination of the temperature of the cylinder head component. Precise determination of the temperature of the cylinder head, again, in conjunction with determination of the temperature along the path of the flowing coolant by the coolant-temperature sensor promotes precise adjustment of the engine's fuel-to-air ratio.

To ensure physical contact between the component-temperature sensor and the section of cylinder head wall, the component-temperature sensor can be forced against the wall section by a spring. The advantage is that manufacturing tolerances in the vicinity of the surface of the cylinder head will have no effect on precise determination of the component temperature.

The component-temperature sensor in another advantageous embodiment of the invention can be forced against the wall section by a resilient element made of an elastomeric material that rests against and seals off the component-temperature sensor from the housing. The component-temperature sensor can for this purpose be completely enclosed, for example in the resilient element. The resilient element can, for example, be vulcanized around the component-temperature sensor on the one hand and into the housing on the other. The component-temperature sensor will have to project axially beyond the forward edge of the uninstalled housing to ensure that it rests tightly against the wall section once the housing has been installed. The resilient element will accordingly also act as a seal, sealing the housing off from the cylinder head.

The coolant-temperature sensor can be accommodated within a depression in the housing that is open to the flow of coolant. The sensor will accordingly be protected from damage, for example, while the housing is being inserted in the recess in the cylinder head. The space-saving accommodation of the sensors allows the housing to be kept very small, so that it can be employed in a wide range of applications with practically no change in design.

Another advantage is that the depression is positioned in the housing where it will ensure that the coolant-temperature sensor is completely surrounded by flowing coolant. To exploit all these advantages, especially that of the simple assembly procedure with no risk to the coolant-temperature sensor, the sensor should not project out of the depression.

The coolant-temperature sensor can be secured inside the housing by webs to ensure that it will be completely surrounded by flowing coolant while determining the latter's temperature. The almost point-to-point attachment of the webs to the inner surface of the housing helps promote flow around the sensor. Damage to the structures that secure the coolant-temperature sensor, while it is being installed for example, is ruled out by the fasteners in the open depression in the housing.

Preferred embodiments of the present invention will now be described with reference to the drawings.

DESCRIPTION OF THE PREFERRED EMBODIMENTS

The preferred embodiments of the present invention will now be described with reference to FIGS. 1 and 2. Identical elements in the two figures are labelled with the same references numerals.

Figure 1:
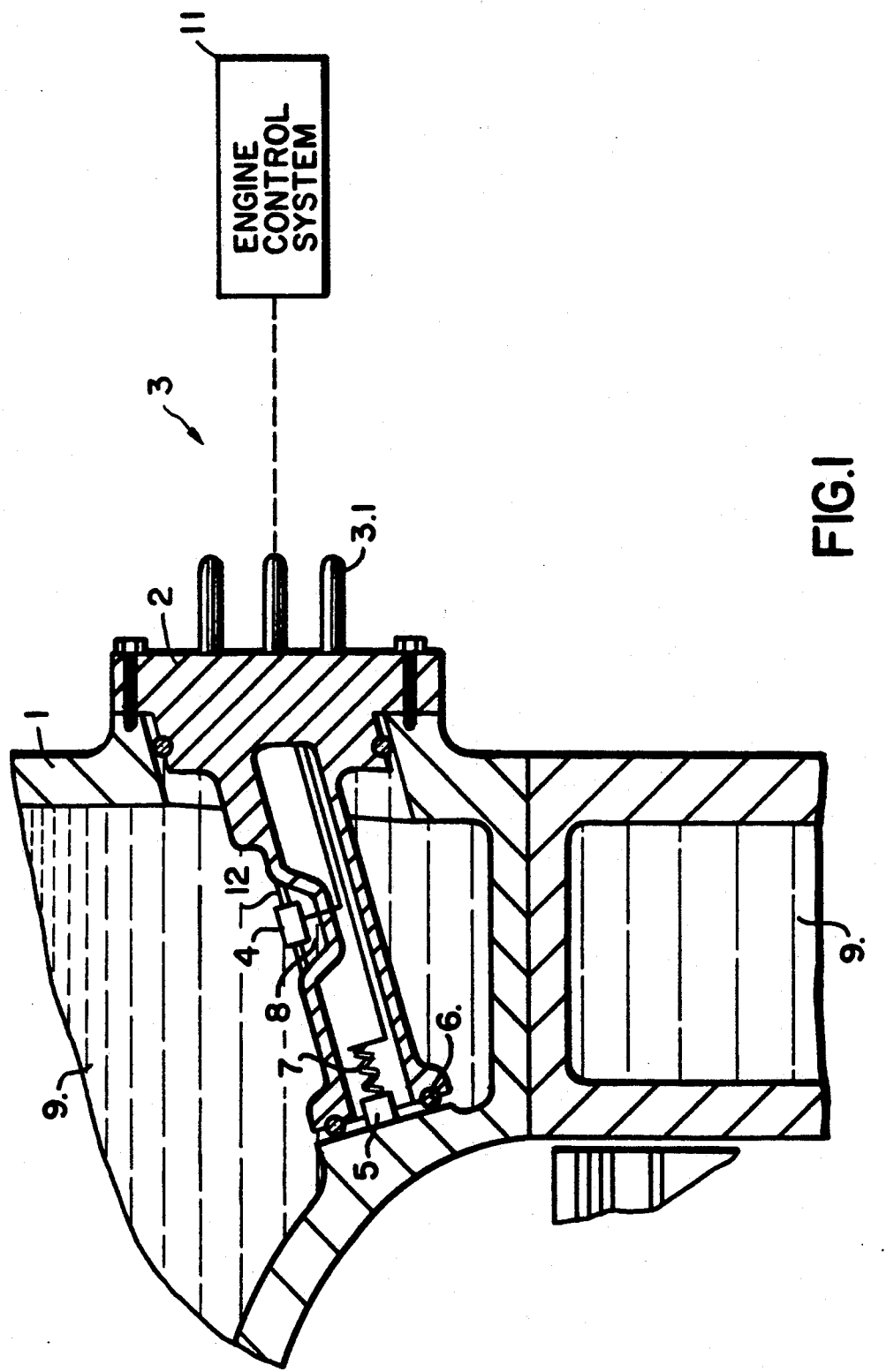
FIG. 1 is a cross-sectional view through an internal combustion engine showing a portion of a cylinder block, a cylinder head and a piston, and showing a temperature transducer according to a first preferred embodiment of the present invention.

FIG. 1 illustrates a housing 2 with leads 3. Leads 3 forward signals from a sensor 4, that senses the temperature of a liquid coolant 9, and from another sensor 5, that senses the temperature of a physical component of a cylinder head 1, to an electronic control system 11 which may control the engine, for example. Lead 31 serves as a ground. A spring 7 forces the component-temperature sensor 5 against a section of the wall of the cylinder head 1. The housing 2 is accommodated in a recess in cylinder head 1 and secured to the head by screws. The interface is sealed off from the environment, by an O-ring in the present case, to prevent the liquid coolant 9 from leaking out of the engine's cooling system. Another O-ring 6 keeps coolant 9 from penetrating into the tubular interior of housing 2, ensuring precise determination of the temperature of the component of cylinder head 1 by the component-temperature sensor 5. The component-temperature sensor 5 is also protected from outside influences detrimental to the operation and life of the temperature transducer. The coolant-temperature sensor 4 is situated at the axis of flow of the coolant 9.

The coolant-temperature sensor 4 is accommodated within a depression 8 that is open to the flow of coolant. This arrangement protects against damage to the sensitive coolant-temperature sensor 4 while the housing is being installed in the cylinder head, for example. The sensor 4 is secured in the housing 2 by webs 12 so as to be completely immersed in the flowing coolant 9 while the temperature transducer is in operation.

Figure 2:
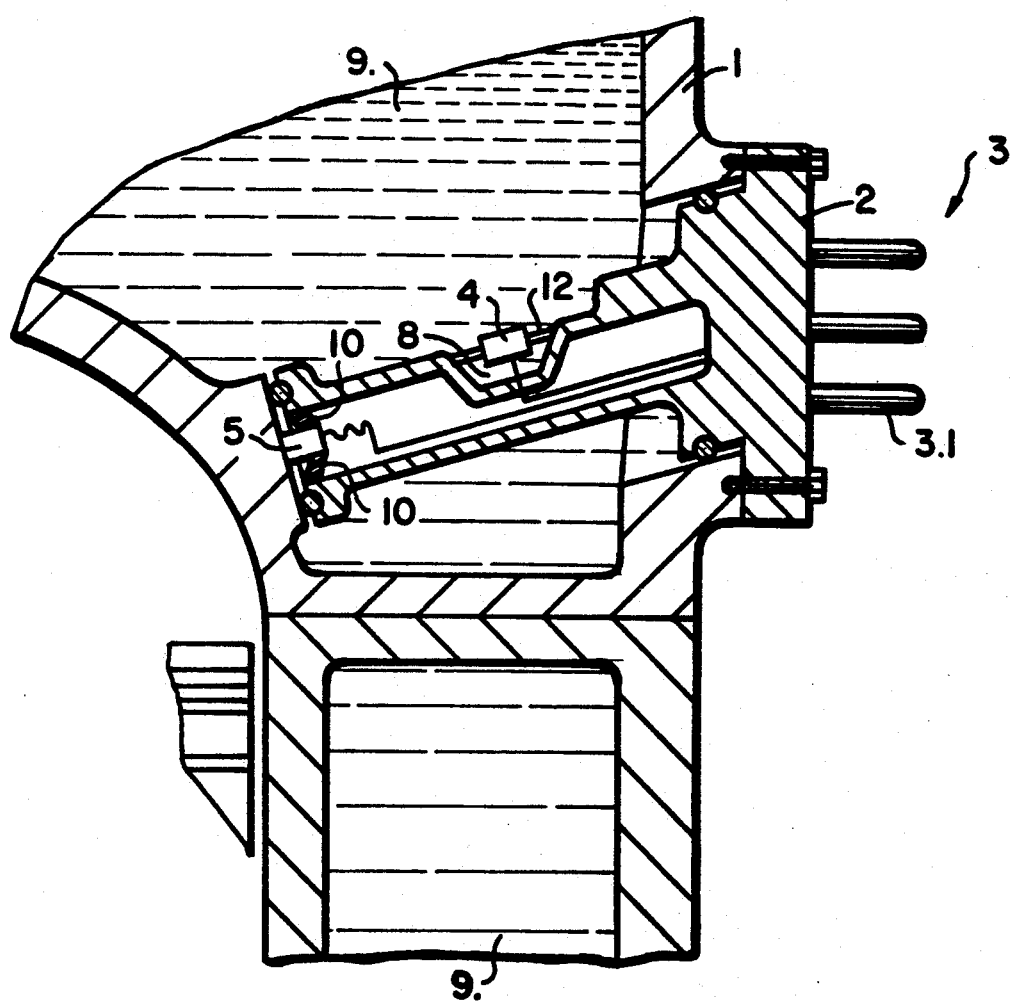
FIG. 2 is cross-sectional view through an internal combustion engine showing the same parts as are illustrated in FIG. 1 and showing a temperature transducer according to a second preferred embodiment of the present invention.

The temperature transducer illustrated in FIG. 2 differs from the one just described in that component-temperature sensor 5 is forced against the wall section by a resilient element 10 of elastomeric material. The resilient element 10 is accordingly radially forced against both component-temperature sensor 5 and the inner surface of the housing 2. The interior of housing 2 is thereby sealed off against the engine's cooling jacket with the coolant 9 inside. This design not only has few parts but also has the advantage that the axial compression against the component-temperature sensor 5 and the confinement of the coolant 9 ensure effective operation and long life. Even high-frequency vibrations will have no detrimental effects. Again, the resilient element 10 helps to position the component-temperature sensor 5 correctly in housing 2, considerably facilitating assembly.

The temperature transducer in accordance with the invention on the whole ensures particularly precise adjustment of the fuel-to-air ratio to the engine's varying operating states by means of the control system, is easy to install in a cylinder head, and is simple and inexpensive to manufacture.

There has thus been shown and described a novel temperature transducer that fulfills all the objects and advantages sought therefor. Many changes, modifications, variations, and other uses and applications of the subject invention will, however, become apparent to those skilled in the art after considering this specification and the accompanying drawings which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. A liquid-cooled internal combustion engine having at least one cylinder member with an internal opening for the passage of a cooling liquid and a temperature transducer arranged in said cylinder member and comprising in combination: a housing, a temperature sensor arranged in the housing for sensing the temperature of the engine coolant, a first lead connected to the coolant-temperature sensor and extending through a wall of the housing for presenting temperature-dependent signals, at least one component-temperature sensor arranged in the housing that rests against a component of the cylinder member and a second lead connected to the component-temperature sensor and extending through a wall of the housing for presenting temperature-dependent signals.

2. The internal combustion engine as defined in claim 1, wherein the first and second leads present signals to an electronic control system.

3. The internal combustion engine as defined in claim 1, wherein the housing has a front end and a rear end and is accommodated in a recess in the cylinder member, and wherein the component-temperature sensor is positioned at the front of the housing and the coolant-temperature sensor is positioned between the front and the rear.

4. The internal combustion engine as defined in claim 1, wherein the housing is essentially tubular.

5. The internal combustion engine as defined in claim 1, wherein the housing is sealed with respect to the cylinder member by at least one O-ring.

6. The internal combustion engine as defined in claim 1, wherein the component-temperature sensor rests against a wall of the cylinder member that demarcates the engine's combustion chamber.

7. The internal combustion engine as defined in claim 1, wherein the component-temperature sensor is forced against a cylinder member wall by a spring.

8. The internal combustion engine as defined in claim 1, wherein the component-temperature sensor is forced against a cylinder member wall by a resilient element made of an elastomeric material that rests against and seals off the component-temperature sensor from the housing.

9. The internal combustion engine as defined in claim 1, wherein the coolant-temperature sensor is accommodated in a depression in the housing that is open to the flow of coolant.

10. The internal combustion engine as defined in claim 9, wherein the coolant-temperature sensor does not project out of the depression.

11. The internal combustion engine as defined in claim 1, wherein the coolant-temperature sensor is secured inside the housing by webs so as to be substantially completely surrounded by flowing engine coolant.

12. The internal combustion engine as defined in claim 1, wherein said cylinder member is a cylinder head.

* * * * *